United States Patent [19]
Milton

[11] 3,936,141
[45] Feb. 3, 1976

[54] MULTIPLE OPTICAL CONNECTOR
[75] Inventor: A. Fenner Milton, Washington, D.C.
[73] Assignee: The United States of America as represented by the Secretary of the Navy, Washington, D.C.
[22] Filed: Nov. 29, 1974
[21] Appl. No.: 528,536

[52] U.S. Cl.............................. 350/96 C
[51] Int. Cl.² .......................... G02B 5/16
[58] Field of Search ............... 350/96 C, 96 WG

[56] References Cited
UNITED STATES PATENTS
3,874,780  4/1975  Love ............................. 350/96 C
3,883,217  5/1975  Love et al. .................... 350/96 WG

*Primary Examiner*—Archie R. Borchelt
*Attorney, Agent, or Firm*—R. S. Sciascia; A. L. Branning; M. L. Crane

[57] ABSTRACT

A connector to provide multiple input-output couplings to a multi-mode optical transmission line without interrupting the radiation flow. A local scrambling cylinder is placed between a multiple input-output bundle and a bidirectional T-coupler. A mirrored surface covers an area of the rod leaving uncovered the core area of the bundle that leads to the T. Input light is reflected by the mirror evenly to provide an optical path between the inputs and the outputs without affecting transmission through the T.

1 Claim, 3 Drawing Figures

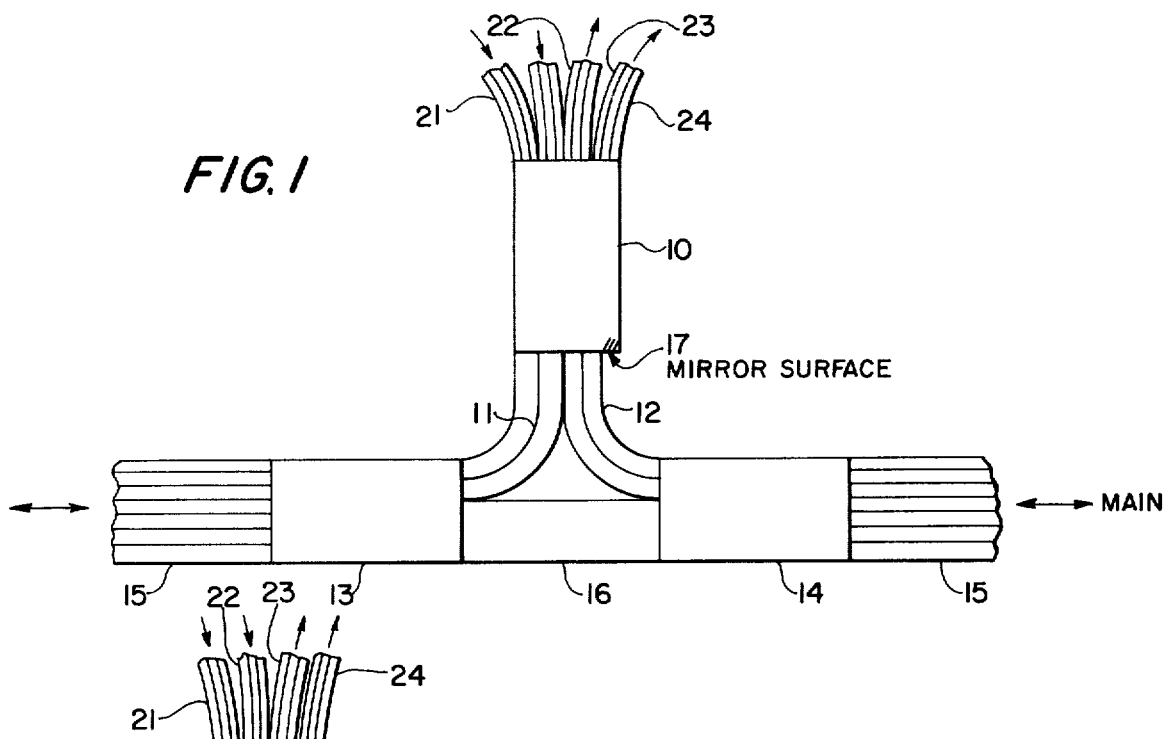
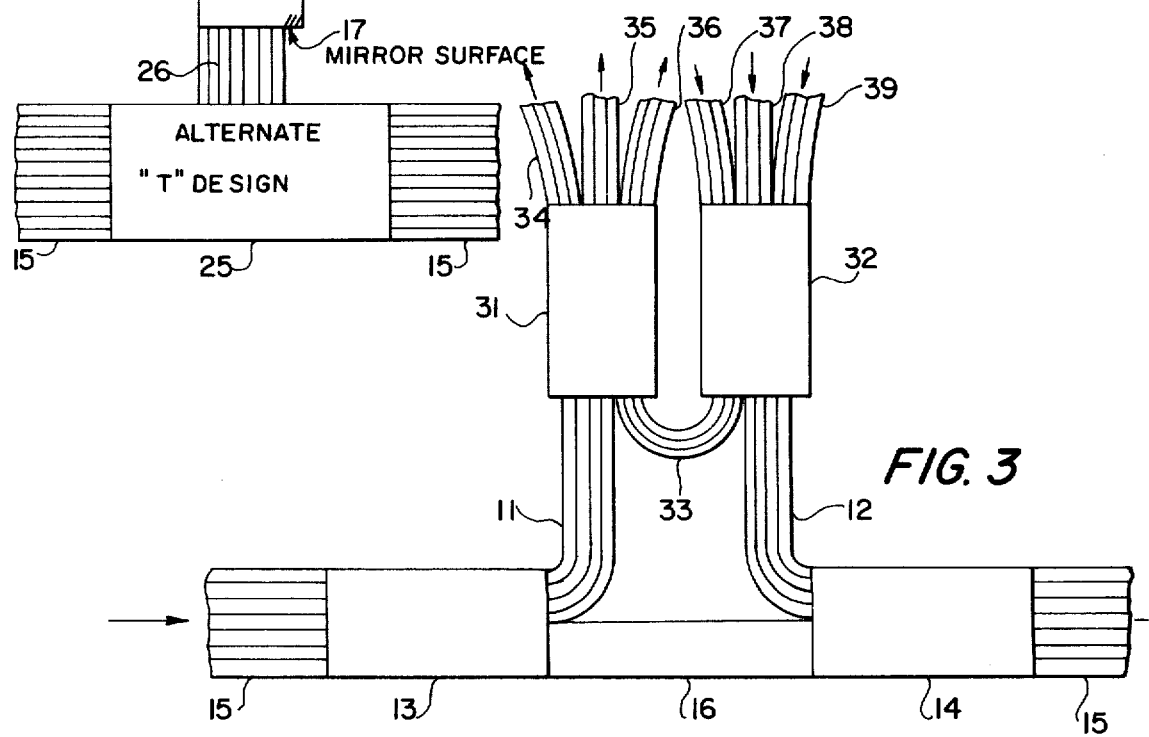

MULTIPLE OPTICAL CONNECTOR

BACKGROUND OF THE INVENTION

This invention is directed to optical radiation connectors, more particularly to optical radiation connectors by which multiple input and output optical radiation transmission lines may be coupled to a main multimode fiber bundle transmission line.

Heretofore optical fiber bundles have been used for transmitting light from one place to another. Straight-through couplings have been used which permit coupling two optical fiber bundles together without any light loss between the bundle paths. There is a need for coupling light into and from an optical transmission line without interrupting the flow of transmission. Such lines may be used for communications, as well as other purposes.

Application serial No. 395,679 filed Sept. 10, 1973, is directed to a T-coupler for coupling information from and into an optical multimode fiber bundle transmission line. This application is an improvement allowing additional information to be added or removed from an optical multimode fiber bundle transmission line.

Summary of the Invention

This invention is directed to a coupler-connector for an optical multimode fiber bundle transmission line in which separate optical radiation scramblers in combination with a mirror is used in combination with the T-coupler for added capability. The combination provides multiple input and output coupling to an optical transmission line comprising a bundle of multimode fibers without completely interrupting the flow of optical radiation. The mirrored surface does not interfere with the optical radiation transmitted to or from the T-coupler. Input light which is reflected at the mirrored surface illuminates all the local output bundles more or less evenly so that an optical path is provided between the local inputs and the local outputs. The separate transparent scrambler rod has a cross sectional area which is comparable to the sum of the areas of the input and output bundles and has a numerical aperture equal to or greater than the fiber used. The combined unit provides an optical path from all the local input bundles to all the local output bundles without affecting transmission through the T-coupler-connector from one portion of the main bundle to the other. Thus the T-connector of the prior application has been converted into a multiple T-connector without any increase in throughput loss.

BRIEF DESCRIPTION OF THE DRAWING

FIG. 1 illustrates a multiple optical radiation connector.

FIGS. 2 and 3 are modifications of the connector arrangement of FIG. 1.

DETAILED DESCRIPTION

Now referring to the drawing, there is shown different modifications of the connector system. FIG. 1 illustrates a separate auxiliary connector 10 connected by separate fiber optic bundles 11 and 12 to a T-connector.

The T-connector includes solid end rods 13 and 14 made of optical material each having the same cross sectional area and shape of main multimode fiber optic bundle transmission lines 15 optically connected thereto. The end rods 13 and 14 are separated by a smaller rod 16 made of optical material which transmits optical radiation from one main transmission line through the rods 13 and 14 to the opposite main transmission line. The rods are sufficiently long that they each act as optical integrators or scramblers ensuring that optical radiation entering the rod is distributed over the entire end of the rod and that the light leaving the rod will be distributed over the entire end of the adjoining main transmission line.

One portion of the lower end of connector 10 is provided with a mirror 17 which reflects incident input radiation through fiber optic bundles 21 and 22 from within the rod to illuminate all the local output bundles 23 and 24 evenly so that an optical path is provided between the local inputs 21 and 22 and the local outputs 23 and 24.

The rod 10 is a transparent radiation scrambler which has a cross sectional area which is comparable to the sum of the areas of the input and output bundles and have a numerical aperture equal to or greater than the fiber optic transmission lines used.

In operation, radiation may be transmitted through the main transmission line in either direction through the end rods 13 and 14 and the central rod 16. Additional radiation will pass through lines 21 and 22 into the connector 10 depending upon the direction of flow. The radiation entering the connector 10 will emerge through all of the other fiber optic bundle lines connected thereto. The connector 10 may be used to add radiation to the radiation transmitted through the main transmission line. Thus, radiation entering through lines 21 and 22 will pass through the scrambler rod out through lines 11 and 12 into the main transmission lines. Also the radiation entering through lines 21 and 22 will be scattered and a portion of it reflected back by the mirror 17 and out through fiber optic bundle 23 and 24.

FIG. 2 illustrates a modification of the connector-coupler of FIG. 1. In FIG. 2 the T-connector-coupler is made of a single optical material rod 25 to which is connected main transmission fiber optic line 15 at its ends and a fiber optic bundle 26 between connector 10 and the T-connector-coupler 25. The connector 10 includes the mirrored end 17 and the input and output fiber optic bundle lines 21–24. In this device, radiation through the main transmission lines will pass through connector-coupler 25 and a portion will enter connector 10. The device is bidirectional. The input output through the upper end connector 10 is the same as set forth above for the device set forth in FIG. 1.

FIG. 3 is a modification illustrating a main optical multimode fiber bundle transmission line and connector-coupler such as set forth for FIG. 1. The fiber bundles 11 and 12 from the coupler rods 13 and 14 are directed to separate connectors 31 and 32. The separate connectors 31 and 32 are connected together by fiber bundle 33 which conducts radiation from one connector 31 or 32 to the other connector 31 or 32 depending upon through which connector radiation is directed. As shown, radiation through main transmission line 15 from the left passes through coupler rods 13, 16, and 14 to the opposite transmission line 15. Also, radiation from rod 13 enters fiber bundle 11 and passes through connector 31 and out through the different optical fiber bundles 34–36. Simultaneously radiation may be added to the system by radiation entering connector 32 through input fiber bundles 37–39. The input radiation passes through connector 32 from which some radiation passes into connector 31 through fiber bundle 33, the remainder of the radiation in connector 32 will pass through fiber bundle 12 through rod 14 and into the main transmission line 15. The radiation from connector 32 through fiber bundle 12 will be added to the main radiation in rod 14 and the total radiation from rod 16 and fiber bundle 12 will pass into the main transmission line 15. This system is bidirectional since radiation may come from the right and be directed out through rod 13 to the main transmission line and through fiber bundle 12 to connector 32 and out through fiber bundle 37–39. Radiation may be added through connector 31 out through connector 32 and through rod 13 out to the main transmission line. The connectors 31, and 32 do not have mirrors on the lower end as set forth for the connector 10 in FIGS. 1 and 2.

The above modifications set forth optical coupler-connectors which provides multiple input and output coupling to and from a multimode fiber bundle transmission line without completely interrupting the flow of optical radiation. Such systems may be used in optical communication systems.

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. In combination, an optical radiation coupler-connector, which comprises:
    a main input optical multimode fiber optic bundle transmission bundle,
    a main output optical multimode fiber optic bundle transmission bundle,
    a main connector formed of an optical radiation transparent dielectric material optically connecting said main input bundle with said main output bundle,
    said main connector including a first solid rod with an input end and an output end said input end optically connected to said main input bundle for conducting all of any input radiation to its output end, a second solid rod with an output and input end said output end optically connected with said main output bundle for conducting input radiation to all of said output bundle, a third solid rod having input and output ends, said input end receiving radiation from a portion of the output end of said first solid rod and conducting said received radiation to a portion of the input end of said second rod,
    first and second auxiliary optical radiation connectors each having an input and an output end,
    optical fiber bundle means optically connected to receive a portion of the output radiation from said first solid rod and transmitting said radiation to said input end of said first auxiliary connector,
    optical fiber bundle means optically connected between said input end of said second solid rod and said output end of said second auxiliary connector,
    an optical fiber bundle connected between the input end of said first auxiliary bundle and the output end of said second auxiliary bundle,
    a plurality of separate optical fiber bundles optically secured to the output end of said first auxiliary optical radiation connector, and
    a plurality of separate optical fiber bundles optically secured to the input end of said second auxiliary bundle.

* * * * *